Patented July 26, 1938

2,124,532

UNITED STATES PATENT OFFICE 2,124,532

MOLDABLE PHENOL-ALDEHYDE RESINS

Josef Schmitz, Wiesbaden, Germany, assignor to The Resinous Products & Chemical Company, Philadelphia, Pa.

No Drawing. Application April 11, 1936, Serial No. 73,859. In Germany April 17, 1935

4 Claims. (Cl. 260—4)

This invention relates to phenol-formaldehyde molding powders, particularly to such molding powders which do not contain any filling material of organic or inorganic nature and which are capable of yielding transparent molded articles. It relates further to a process for the manufacture of such powders.

Molding powders made from hardenable phenol-formaldehyde condensation products with which various filling materials, such as wood flour, fibrous material, or inorganic fillers like asbestos, clay, etc., have been incorporated are well known. These are usually made by mixing a phenol, such as phenol, any of the cresols or their technical mixtures, the xylenols etc., with formaldehyde, condensing the components until they form a product which has not assumed a rubber-like consistency, and then mixing them with the fillers, plasticizers, etc. and a substance which on heating will generate formaldehyde, such for instance as hexamethylenetetramine. This mixing and prehardening operation is usually carried out on heated rollers and is continued to a point just short of that at which the mass assumes a rubber-like character. The resulting mass is then reduced to a powder and can be molded and hardened completely under the action of heat and pressure. Such molded articles are always opaque and their properties depend largely on the filling material used.

Attempts have been made to prepare moldable, transparent, pure phenol-formaldehyde resins by omitting the filling material but otherwise using the same methods of preparation. These attempts failed because the pure resins hardened too slowly and yielded molded articles which were opaque and contained numerous bubbles formed by the decomposition of the hexamethylenetetramine.

Also it has been suggested to produce transparent pressed articles free of fillers from phenolformaldehyde condensation products by the addition of an aqueous solution of hexamethylenetetramine. But in this case the product is dehydrated in vacuo before the beginning of the prehardening. This is not only troublesome and consumes considerable time but also requires the use of special devices. Moreover, as will be explained below, it is inexpedient also for other reasons to dehydrate the material before the prehardening.

It is an object of this invention to provide a phenol-formaldehyde resin which when free of fillers can be molded into clear, transparent objects in the ordinary way under heat and pressure. It is a further object to provide such a resin in powder form, which may be completely hardened in a short time thus making its use commercially feasible.

It has been found that a moldable resin which will harden sufficiently rapidly and which will yield transparent bubble-free products containing no fillers may be prepared in a simple manner. This is accomplished by prehardening a phenolformaldehyde condensation product in the presence of hexamethylenetetramine or another hardening agent, as paraformaldehyde, trioxymethylene and the like and water to the point where it just starts to become rubbery. At this point the resin is not completely fusible. In this condition it possesses just sufficient plasticity to permit it to flow properly in a mold under the conditions of pressure and temperature usually used for molding the ordinary phenol-formaldehyde powders.

The prehardening of the phenol-formaldehyde condensation product may be carried out in a mixer or on heated rolls. The presence of water, whether added along with the hexamethylenetetramine or whether a concentrated aqueous solution of the hexamethylenetetramine is used, is essential in order to insure a prefectly uniform distribution of the latter in the resin. During the course of the prehardening, and particularly when it is carried out on heated rolls, the water is evaporated so that it cannot interfere in any way with the subsequent molding operations. Without the addition of the water or some other low boiling solvent for hexamethylenetetramine, as alcohol, acetone or the like, the distribution of the hexamethylenetetramine is incomplete and this always leads to cloudy molded articles which are full of bubbles. If, instead of removing the water or other solvent and prehardening on heated rolls as just described, the solvent is first removed by distillation in vacuo and then hardened, special precautions have to be observed during the second step in order to avoid over-hardening. The process must be carried out between 50° and 70° and the hardness must be precisely controlled. But in the presence of water particularly at the beginning of the prehardening, the process may be carried on according to the present invention in much simpler manner and without special precautions, as the evaporation of the water or of the other solvent present causes a cooling and thereby prevents overheating of the mass on the rollers. At the same time the water or other solvent acts as a plasticizer and homogenizer, thus facilitating and promoting the manipulation of the mass. The water also serves the purpose of reducing the melting point of the condensation product before prehardening sets in so that even at temperatures of 50° C. it is still plastic and easily mixed with the hexamethylenetetramine. The amount of water added should not exceed 10 or 15% in order to avoid cloudiness during the molding operation.

This invention may be illustrated by the following examples but it is not limited to the exact procedure or phenol-formaldehyde condensation product given as it may otherwise be practiced within the scope of the appended claims.

Example 1

A condensation product is prepared from one mol. of phenol and 0.85 mol. of formaldehyde in the presence of about 0.5% of hydrochloric acid. This product is then placed in a mixing apparathus such as a Werner and Pfleiderer mixer and thoroughly mixed with about 10% of water and about 14% of hexamethylenetetramine or another hardening agent, as paraformaldehyde, trioxymethylene or similars at a temperature of 80 to 85° C. until it just begins to exhibit a rubbery character. Plasticizers and mold lubricants such as about 1–5% tricresyl phosphate, stearic acid or others are added during this operation. The end point of this operation may be determined by testing the solubility of the product in alcohol. It should be in such a condition that it just dissolves in the alcohol. Coloring materials may be added at this point if desired. The resin thus obtained is then subjected to further hardening on heated rolls until it is in a condition between the so-called A stage and B stage. It is a clear, transparent mass which cannot be completely fused but which is still plastic and can be rapidly transformed to the final hard stage by heating under pressure in the usual manner. After removal from the rolls the material is broken up into small pieces or ground to a powder. It may then be molded in the usual manner under pressure at temperatures of 150–180° C.

Example 2

A mixture of one mol. of phenol and 0.8 mol. of formaldehyde is heated in the presence of hydrochloric acid until the condensation product has a melting point of 64–73° C. It is then melted in a mixer, 3–6% of plasticizer such as zinc salt of stearic acid is added and well mixed. Then 15% of water is added which is readily taken up by the resin thus rendering it more plastic and easily worked. When the water has been completely absorbed, 15% of hexamethylenetetramine is added and thoroughly mixed in while the temperature is being raised gradually to 105° C. As soon as the mass begins to show a rubbery consistency and is just soluble in alcohol it is removed from the mixer and worked up on heated rolls as described in Example 1. The final powder can be easily and quickly molded to clear, transparent articles under pressure at temperatures of 150–180° C.

In place of the phenol shown in the foregoing examples other phenols such as the cresols, xylenols, naphthols, etc. may be used and the water may be replaced by other low-boiling solvents for hexamethylenetetramine such as alcohol, acetone and others.

The molded articles made from such resins do not stick to the mold, nor do the resins have any chemical action on the mold surfaces. The gloss, strength, electrical and heat resistance of the molded resins are very good. The flexural strength is about 1,000 kg./sq. cm., impact strength 17 cm. kg./sq. cm.; the surface resistance under ordinary atmospheric conditions is $10^5$ till over $10^6$ megohms and after soaking in water for 24 hours it is $10^4$ till $10^6$ megohms.

Resins of various colors may be made by adding suitable dyes soluble in the finally hardened resin. The dyes are preferably added in the mixer so that a uniform distribution is obtained. The articles molded from such resins are perfectly clear and transparent. They have a high gloss and their mechanical strength compares favorably with that of the ordinary opaque articles made from phenol-formaldehyde condensation products containing fillers.

If desired, two resin powders of different color may be imperfectly mixed and on molding such powders various unique effects may be obtained.

I claim:

1. The process of preparing filler-free phenol-formaldehyde molding resins capable of being molded to transparent articles, which comprises adding hexamethylenetetramine and a volatile solvent sufficient to dissolve it to a phenol-formaldehyde condensation product, kneading at temperatures of about 100° C. to remove the solvent and simultaneously harden the product to the point at which it begins to assume a rubber-like consistency.

2. The process of preparing filler-free phenol-formaldehyde molding resins capable of being molded to transparent articles, which comprises adding hexamethylenetetramine and sufficient water to dissolve it to a phenol-formaldehyde condensation product, kneading at temperatures of about 100° C. to remove the water and simultaneously harden the product to the point at which it begins to assume a rubber-like consistency.

3. The process of preparing filler-free phenol-formaldehyde molding resins capable of being molded to transparent articles, which comprises condensing one mol. of phenol with less than 0.9 mol. of formaldehyde, adding a concentrated solution of hexamethylenetetramine, kneading at temperatures of about 100° C. to remove the water and simultaneously harden the product to the point at which it begins to assume a rubber-like consistency.

4. The process of preparing filler free phenol formaldehyde molding resins capable of being molded to transparent articles which comprises adding a concentrated aqueous solution of hexamethylenetetramine to a phenol formaldehyde condensation product in such amounts that the total water present does not exceed 15% by weight of the resin, kneading the mixture at a temperature of about 100° C. to remove the water and simultaneously harden the product to the point at which it begins to assume a rubber-like consistency.

JOSEF SCHMITZ.